(12) United States Patent
Synnestvedt et al.

(10) Patent No.: US 7,921,210 B1
(45) Date of Patent: Apr. 5, 2011

(54) POLICY SYSTEM THROTTLING AND LOAD BALANCING

(75) Inventors: Robert Glenn Synnestvedt, Palo Alto, CA (US); Tsu-Phong Wu, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1262 days.

(21) Appl. No.: 10/263,300

(22) Filed: Oct. 1, 2002

(51) Int. Cl.
*G06F 15/16* (2006.01)
*G06F 15/173* (2006.01)
(52) U.S. Cl. ........ 709/226; 709/223; 709/224; 709/228; 709/229
(58) Field of Classification Search .................. 709/224, 709/241, 223, 226; 370/236, 401, 219; 379/219, 379/201.01
See application file for complete search history.

(56) References Cited

U.S. PATENT DOCUMENTS

| 6,055,571 | A  | * | 4/2000  | Fulp et al. ..................... 709/224 |
| 6,477,582 | B1 | * | 11/2002 | Luo et al. ...................... 709/241 |
| 6,483,912 | B1 | * | 11/2002 | Kalmanek et al. ............ 379/219 |
| 6,522,629 | B1 | * | 2/2003  | Anderson, Sr. ................ 370/236 |
| 6,671,724 | B1 | * | 12/2003 | Pandya et al. ................. 709/226 |
| 6,850,531 | B1 | * | 2/2005  | Rao et al. ...................... 370/401 |
| 6,856,676 | B1 | * | 2/2005  | Pirot et al. ............... 379/201.01 |
| 2003/0005112 | A1 | * | 1/2003 | Krautkremer ................. 709/224 |
| 2003/0110252 | A1 | * | 6/2003 | Yang-Huffman ............. 709/224 |
| 2004/0003069 | A1 | * | 1/2004 | Wong ............................ 709/223 |

* cited by examiner

*Primary Examiner* — Quang N. Nguyen
(74) *Attorney, Agent, or Firm* — Marger Johnson & McCollom, P.C.

(57) ABSTRACT

A method and system to control call admissions into data networks is disclosed. A network device has a port to receive a pre-authentication request associated with a call and a status memory to store system status information. A processor in the device is configured to determine if the pre-authentication request can be granted based upon the system status information. The method receives a pre-authentication request associated with a call and accesses system status information. The method then determines if the request can be granted.

19 Claims, 2 Drawing Sheets

POLICY SYSTEM THROTTLING AND LOAD BALANCING

BACKGROUND

1. Field

This disclosure relates to policy systems, more particularly to interactions between policy systems and call admission control systems.

2. Background

Wholesale dial and voice over data networks are deployed to manage a target number of active sessions, or calls. For ease of discussion, voice over data networks calls will be referred to as Voice over Internet Protocol (VoIP) calls, with no intention to limit the implementation of data networks to IP networks. Networks that provide access to both dial and VoIP network services will be referred to as Any Service Any Port (ASAP) networks.

Wholesalers own the networks and access to the networks to customers, typically network service providers such as America OnLine (AOL). These sales of access are typically governed by service level agreements (SLA). The wholesaler must purchase enough equipment, ports and circuits, with enough redundancy to be able to honor the SLAs.

Networks are typically built for peak steady state operations, taking into consideration the bandwidth necessary for transferring call data through the network. Many wholesalers overlook transients that can impact their network. They rely on vendors to provide some basic form of call denial or 'least cost' routing as one safe guard for a particular node in the system to avoid catastrophic events for the node.

One such safeguard currently in use is Call Admission Control (CAC). A typical CAC system has 'high water' marks, or thresholds, set for sub-system components such as central processing unit (CPU) utilization, memory utilization, etc. After the threshold is exceeded, the system will reject new requests.

However, one of the issues with current CAC systems is that they are reactive. They only act after the threshold is exceeded. If the threshold is set too low, the platform will cycle in and out of reject mode. This lowers the 'average' call success rate. If the threshold is set too high, the platform will accept too many calls onto its circuits, impacting service for many calls. Additionally, CAC systems typically have a timer that has to expire for the system to return to accepting calls. If the threshold is triggered for an instant, all calls will be denied until the timer expires. It would be advantageous to make call acceptance decisions before resources were allocated to the call. Similarly, it would be better if the decisions were made in a more dynamic manner, without having to wait for timers to expire.

Another issue with current CAC systems is that it operates on the platform level. The platform may accept calls into a network at a rate that cannot be sustained by other platforms required to manage setting up the call. It would be helpful if the CAC-type limitations could be set and managed at the system level. The decision should be controlled sufficiently upstream of call setup so that call redirection, hunting and similar processes could allow selection of a different set of resources.

An additional issue with the platform-level CAC systems is that they are static and sub-system oriented. As networks are upgraded, and the system and service mix changes, it increases the difficulty of provisioning the network. Each CAC sub-system limit has to be individually adjusted across the entire network. Management of these types of limits in a more centralized manner would seem more practical.

SUMMARY

One embodiment of the invention is a network device to control call admissions into data networks. The network device has a port to receive a pre-authentication request associated with a call and a status memory to store system status information. A processor in the device is configured to determine if the pre-authentication request can be granted based upon the system status information.

Another embodiment of the invention is a method for controlling call admissions into data networks. The method receives a pre-authentication request associated with a call and accesses system status information. The method then determines if the request can be granted. In one embodiment, the method then identifies an optimal circuit for the call. In another embodiment, the method sets call parameters for the call.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
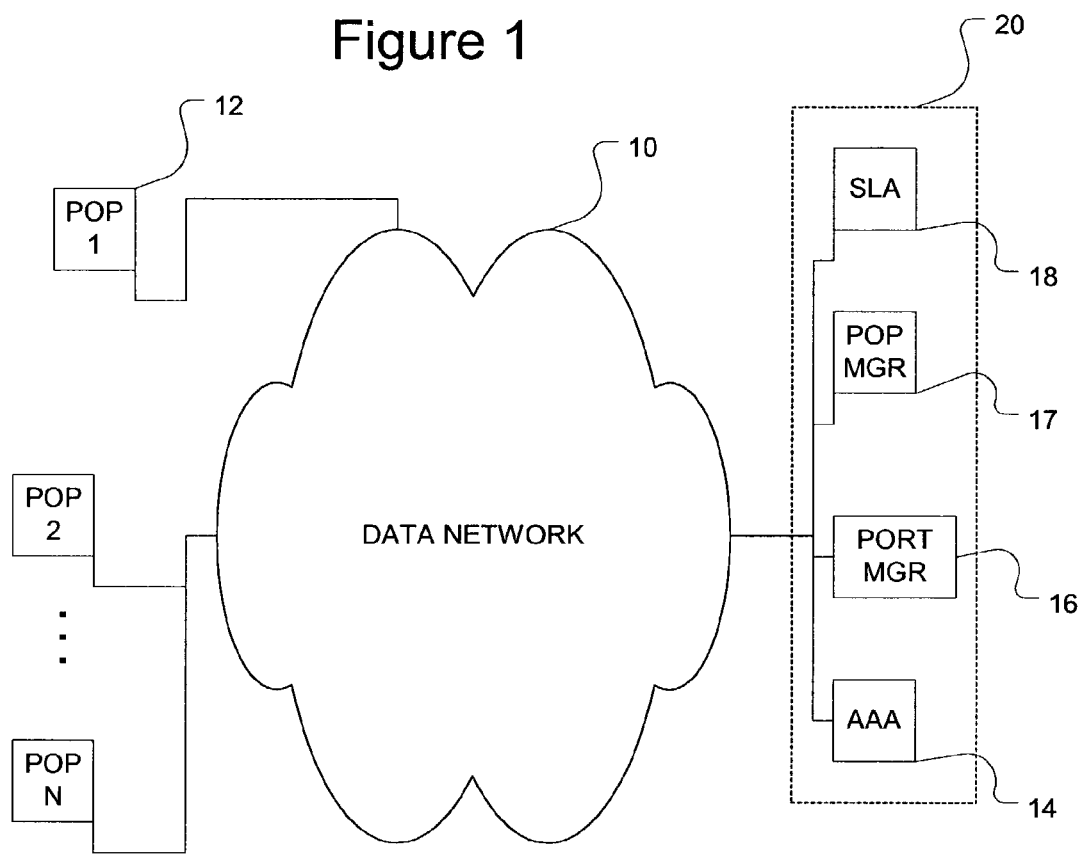
FIG. 1 shows an embodiment of a wholesale network under the control of a policy system.

In FIG. 1, a wholesale network 10 is accessed by users through the points-of-presence (POP) such as 12. The network 10 is governed by a policy system 20 that may include several policy processors, such as SLA processor 18, POP manager 17, and port manager 16, as well as authentication, authorization and accounting (AAA) server 14. These may actually all be implemented in one device, but will be referred to as a policy system 20.

The policy system governs the network to ensure that the agreements between the network wholesaler and its customers are met, as well as other policies, such as port policies and POP policies. A port policy may include a number of active ports allowed per customer or per piece of hardware; a POP policy may govern the number of users associated with a particular customer allowed on a particular POP. Service level agreement policies are generally a little more complex, as they govern the service level for a given number of users associated with a particular customer and can include such considerations as the time of day, a guaranteed service level as well as a best efforts service level. All of these policies are coordinated by the policy system, which may receive many of the same inputs generated and received by the AAA server.

Enforcing call admissions control on a system-wide basis allows the system to ensure end-to-end system availability and to allow a decision on call acceptance prior to commitment of resources. Similarly, if system capabilities change because of added, removed or upgraded equipment, the thresholds for decision making can be altered system wide in a simple fashion, rather than having to individually set the thresholds for each device.

The system wide control of call acceptance will be referred to call admissions control (CAC). That term is typically applied to the device-level logic that is employed by call receiving circuits such as gateways, but will be used here to refer to the implementation of a similar function on a system-wide basis. The system-wide CAC will receive as inputs the current status of the hardware circuits, such as trunks, ports and modems, as well as the various policy limits set by SLA servers, policy processors and other components of the policy system. These inputs may be mapped in a memory and updated as parameters change, or they may be accessed dynamically. More than likely, as speed will be of the essence in making the decisions about call acceptance, the system status information will be a combination of stored information and dynamically accessed information.

System status information, as the term is used here, means information about the current capability of the entire system under policy control. It may include the hardware information mentioned above, policy considerations, sub-system metrics such as CPU and memory utilization and any resource indicators available. A resource indicator is a message between a receiving circuit and a call controller that indicates the current availability on a circuit. For examples, gateways in compliance with the H.323 recommendation from the International Telecommunications Union (ITU) send a message to their controller gatekeepers called a Resource Availability Indicator (RAI). Such indicators would be part of the system status information, if RAIs were used.

Figure 2:
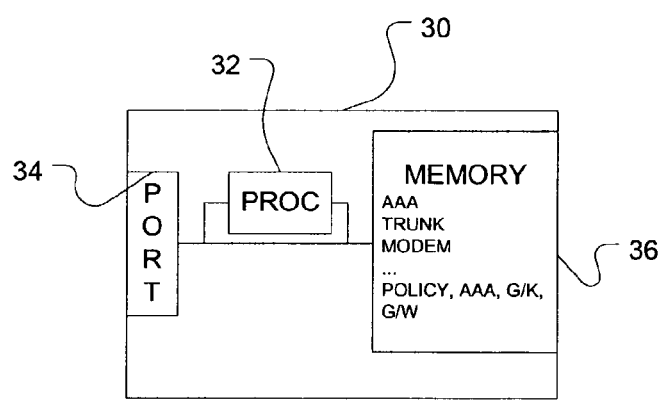
FIG. 2 shows an embodiment of a network device to manage call admission control.

A network device operable to control call admissions control on a system-wide basis is shown in FIG. 2. A port 34 receives a pre-authentication request. In Any Service Any Port (ASAP) networks, a pre-authentication request may be used to allow the network to decide whether or not to take the call. Currently, these pre-authentication requests have not been used system-wide, but only on the device level, such as at the gateway level. Similarly, the governing parameters, such as CPU usage, memory utilization, etc., have been monitored from the device level as well.

However, the processor 32 on the network device 30 is used to monitor and make call admissions determinations at the system level. This network device may be a Resource Pool Management Service (RPMS) device deployed by Cisco™ or any other resource management application or device used to manage resources against usage. The processor 32 accesses the system status information, discussed above. The status information may be partially stored in the memory 36, with some pieces of information accessed dynamically, or it may store all of the current system parameters. The memory 34 is shown as being part of the same network device 30 as the processor, but it may actually be physically located on another network device or distributed among several network devices. The processor 32 then uses the system status information to determine if the call can be admitted.

Figure 3:
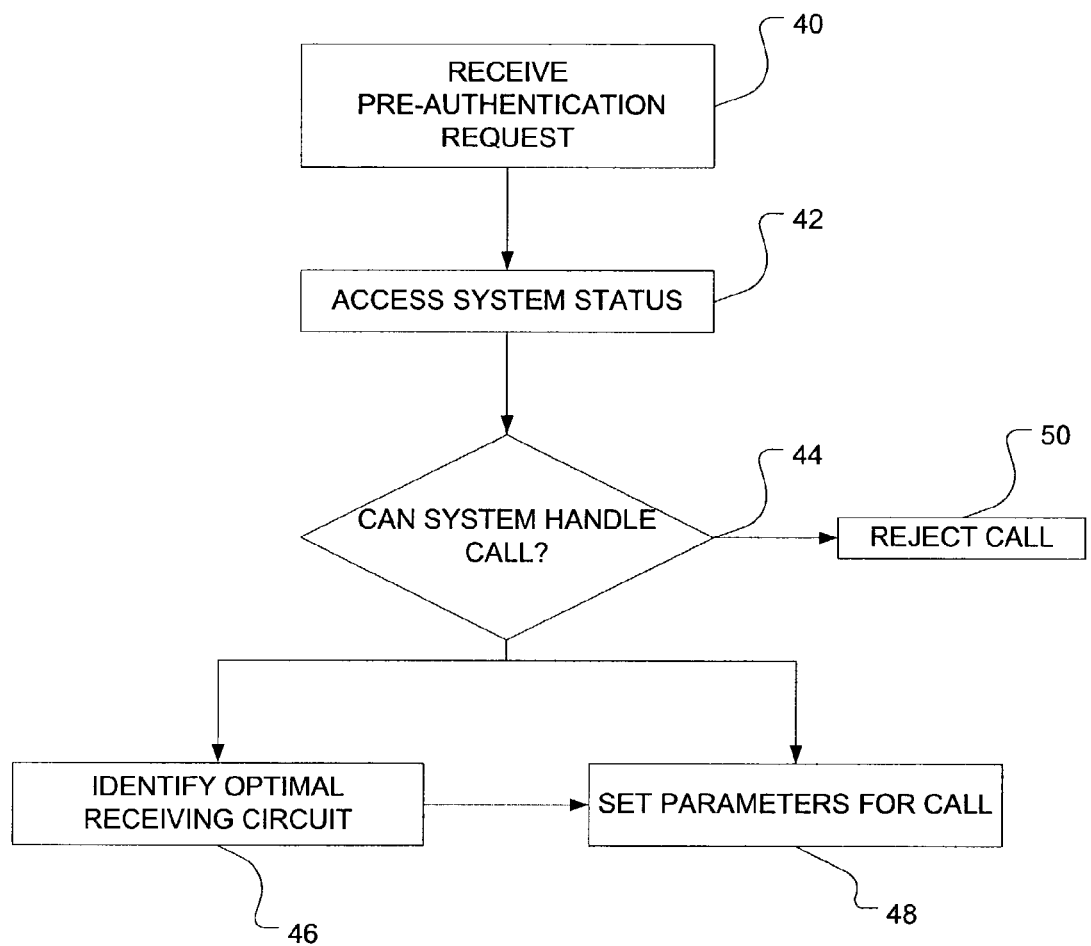
FIG. 3 shows an embodiment of a method to control call admissions on a network.

In addition to the call acceptance/admission process, the processor may also determine the optimal receiving circuit for the call as well as to define parameters for the call, depending upon the system status information. This is discussed in more detail with reference to FIG. 3.

At 40, the pre-authentication request associated with an incoming call is received. The processor or network device then accesses the system status at 42. At 44, the processor makes the initial determination as to whether the system can accept the call. If the call cannot be accepted because the system-wide status indicates that it cannot meet the call requirements, the call is rejected at 50.

If, however, the call can be accepted, the system may identify the optimal circuit to accept the call at 46. This may be based upon several parameters, including the type of call, such as whether the call is a VPDN (virtual private dial-in network) call, a TDM (time division multiplexed) call, or and interactive voice response call, as examples. The type of call may determine the level of resources needed to accept the call. An IVR call is much more resource-intensive than a TDM switched call, for example. The network device could be provisioned to distinguish between these at pre-authentication based upon dialed-number identification service (DNIS).

Identifying the optimal circuit may require an analysis of the possible route to be taken by the call. The network device then may specify which route the call should be taken, in addition to the receiving circuit for the call, such as the appropriate gateway for the call traffic. This allows the device to balance the system load.

Once it is determined that the system can handle the call within its policies and capabilities, it may also throttle the call traffic associated with that call at 48. This could be done once the call is accepted, or after the optimal receiving circuit is determined. More than likely, throttling will occur after the optimal receiving circuit is identified, as how the call is throttled will be determined by the receiving circuit for the call. For example, the network device may set the particular modem speed to manage the call, or a particular bandwidth for the call traffic. Other types of throttling may be employed, such as limiting the number of calls any one device can accept based upon the capabilities of the devices downstream of that particular device.

In this manner, system-wide capabilities are included in the decisions to accept calls. The system-wide capabilities, status and relevant policies can be managed by the policy system. The network device is just one example of such a policy system; it may actually include more than one device. Similarly, it may be implemented on an existing network device as a software upgrade in which machine-readable code causes the machine to implement the processes of the invention. In this case, the invention may be implemented as an article of the machine-readable code.

Thus, although there has been described to this point a particular embodiment for a method and apparatus for policy system load balancing and throttling in data networks, it is not intended that such specific references be considered as limitations upon the scope of this invention except in-so-far as set forth in the following claims.

What is claimed is:

1. A network device, comprising:
    a port to receive a pre-authentication request associated with a call;
    a status memory to store system status information, wherein the system status information includes a number of active ports allowed, a number of users allowed for a customer, sub-system metrics, and a service level for a predetermined number of users associated with the customer; and
    a processor to:
        determine if the pre-authentication request can be granted based upon the system status information and a type of the call;
        identify an optimal receiving circuit for the call based upon the system status information after determining if the pre-authentication request can be granted; and
        throttle call traffic associated with the call based upon the system status information after identifying the optimal receiving circuit for the call, wherein throttling the call comprises limiting the number of calls routed to a particular device based upon the capabilities of other devices downstream of the particular device.

2. The network device of claim 1, wherein the system status information includes information about trunks, ports and modems.

3. The network device of claim 1, wherein the system status information includes inputs from gateways, AAA servers and policy processors.

4. The network device of claim 1, wherein throttling the call further comprises setting a bandwidth allowable for the call.

5. The network device of claim 1, wherein throttling the call further comprises setting a modem speed allowable for the call.

6. The network device of claim 1, wherein the sub-system metrics include CPU utilization and memory utilization.

7. The network device of claim 1, wherein the type of the call is one of a virtual private dial-in network (VPDN) call, a time division multiplexed (TDM) call, and an interactive voice response call.

8. The network device of claim 1, wherein the processor is further to distinguish a type of the call based upon a dialed-number identification service (DNIS).

9. A method of managing call admissions into a network, the method comprising:
   receiving a pre-authentication request associated with a call;
   accessing system status information from a status memory, the system status information including number of active ports allowed, a number of users allowed for a customer, sub-system metrics, and a service level for a predetermined number of users associated with the customer;
   determining if the request can be granted, based upon the system status information and a type of the call; and
   if the request can be granted:
      identifying an optimal circuit for the call after determining if the request can be granted; and
      throttling call traffic associated with the call based upon the system status information after identifying the optimal circuit for the call, wherein throttling the call comprises limiting the number of calls routed to a particular device based upon the capabilities of other devices downstream of the particular device.

10. The method of claim 9, wherein the system status information includes status of trunks, ports and modems.

11. The method of claim 9, wherein the system status information includes inputs from policy processors, AAA servers and gateways.

12. The method of claim 9, wherein the method further comprises managing limits on sub-systems in the optimal circuit.

13. The method of claim 9, wherein the sub-system metrics include CPU utilization and memory utilization.

14. The method of claim 9, wherein the type of the call is one of a virtual private dial-in network (VPDN) call, a time division multiplexed (TDM) call, and an interactive voice response call.

15. A network device, comprising:
   a means for receiving a pre-authentication request associated with a call;
   a means for storing system status information, wherein the system status information includes number of active ports allowed, a number of users allowed for a customer, sub-system metrics, and a service level for a predetermined number of users associated with the customer; and
   a means for:
      determining if the pre-authentication request can be granted based upon the system status information and a type of the call;
      identifying an optimal receiving circuit for the call based upon the system status information after determining if the pre-authentication request can be granted; and
      throttling call traffic associated with the call based upon the system status information after identifying the optimal receiving circuit for the call, wherein throttling the call comprises limiting the number of calls routed to a particular device based upon the capabilities of other devices downstream of the particular device.

16. A non-transitory computer-readable storage media storing code that, when executed by a computer, causes the computer to:
   receive a pre-authentication request associated with a call;
   access system status information from a status memory, wherein the system status information includes number of active ports allowed, a number of users allowed for a customer, sub-system metrics, and a service level for a predetermined number of users associated with the customer;
   determine if the request can be granted, based upon the system status information and a type of the call;
   identify an optimal receiving circuit for the call based upon the system status information after determining if the request can be granted; and
   throttle call traffic associated with the call based upon the system status information after identifying the optimal receiving circuit for the call, wherein throttling the call traffic comprises limiting the number of calls routed to a particular device based upon the capabilities of other devices downstream of the particular device.

17. The non-transitory computer-readable storage media of claim 16, wherein the code, when executed by the computer, further causes the computer to manage limits on sub-systems in the optimal circuit.

18. The non-transitory computer-readable storage media of claim 16, wherein the sub-system metrics include CPU utilization and memory utilization.

19. The non-transitory computer-readable storage media of claim 16, wherein the type of the call is one of a virtual private dial-in network (VPDN) call, a time division multiplexed (TDM) call, and an interactive voice response call.

\* \* \* \* \*